United States Patent

Newley et al.

[11] Patent Number: 5,660,482
[45] Date of Patent: Aug. 26, 1997

[54] BEARINGS

[75] Inventors: Richard Andrew Newley, Clifton; Paul Raymond Smith, Sudbrooke; Alun Davies-Jones, Knowle, all of United Kingdom

[73] Assignee: Dowty Aerospace Gloucester Limited, Gloucester, United Kingdom

[21] Appl. No.: 373,255
[22] PCT Filed: Jul. 21, 1993
[86] PCT No.: PCT/GB93/01537
   § 371 Date: Dec. 20, 1995
   § 102(e) Date: Dec. 20, 1995
[87] PCT Pub. No.: WO94/02750
   PCT Pub. Date: Feb. 3, 1994

[30] Foreign Application Priority Data

Jul. 21, 1992 [GB] United Kingdom .................. 9215470

[51] Int. Cl.[6] ......................... F16C 23/04; F16C 33/24
[52] U.S. Cl. ..................... 384/192; 384/206; 384/909; 384/913
[58] Field of Search ............................ 384/206, 213, 384/276, 297, 625, 907, 909, 913

[56] References Cited

U.S. PATENT DOCUMENTS

| 4,846,122 | 7/1989 | Kristof et al. | 123/179 F |
| 4,848,934 | 7/1989 | Blakely et al. | 384/206 |
| 4,938,850 | 7/1990 | Rothschild et al. | 204/29 |
| 5,325,732 | 7/1994 | Vogel | 384/909 X |
| 5,328,273 | 7/1994 | Nonaka et al. | 384/206 |

FOREIGN PATENT DOCUMENTS

| 2218797 | 9/1974 | France . |
| 61000596 | 1/1986 | Japan . |
| 1158217 | 6/1989 | Japan . |

Primary Examiner—Thomas R. Hannon
Attorney, Agent, or Firm—Baker & Botts, L.L.P.

[57] ABSTRACT

A sliding contact bearing, especially an aircraft landing gear trunnion bearing, comprises two bearing members (1, 3) composed of titanium or titanium alloy with cooperating sliding surfaces (2, 4), a first one of which is chromium plated and the second one of which is coated with nickel and fluorocarbon polymer. Preferably, the nickel coating is applied by an electroless plating process, and the fluorocarbon is infused into pores in the nickel plating. Preferably, the nickel and fluorocarbon coating is 0.025 to 0.041 mm thick, and has a hardness in the range 750–1000 VPN.

6 Claims, 1 Drawing Sheet

BEARINGS

TECHNICAL FIELD

This invention relates to bearings, especially sliding contact bearings used in aircraft landing gear and incorporating titanium components in surface-to-surface sliding contact.

Titanium is used in aircraft construction because it is lightweight compared with steel, but when used in bearings such as landing gear trunnion bearings that experience large shock loads, there can be problems with galling and seizure between titanium surfaces sliding on one another. It has been proposed in U.S. Pat. No. 4848934 to overcome this problem by coating the surface of one titanium bearing component with chromium oxide and forming the other component of copper. Although chromium oxide is a brittle material, it is considered satisfactory provided the complementary bearing surface with which it cooperates includes copper or copper alloys.

DISCLOSURE OF THE INVENTION

According to the present invention a sliding contact bearing comprises two bearing members composed of titanium or a titanium alloy with cooperating sliding surfaces, characterised in that a first one of said surfaces is chromium plated and the second one of said surfaces is coated with nickel and fluorocarbon polymer.

The nickel is preferably applied by an electroless plating process and provides a high level of wear and corrosion resistance. The fluorocarbon polymer is deposited on the metal surface so as to provide permanent lubrication between the two surfaces. A suitable nickel/fluorocarbon polymer coating may be provided by the General Magnaplate Corporation under their trade mark "NEDOX".

Comparative tests indicate that a bearing according to the invention offers comparable performance and durability to that of conventional bearings comprising a chromium plated steel member in sliding cooperation with an aluminium bronze member and superior performance compared to bearings involving chromium plated, or chromium oxide coated or bronze coated bearing surfaces. Further, bearings according to the invention offer the advantage of limiting the friction between the bearing surfaces due to the effect of the fluorocarbon polymer used.

MODE OF CARRYING OUT THE INVENTION

Figure 1:
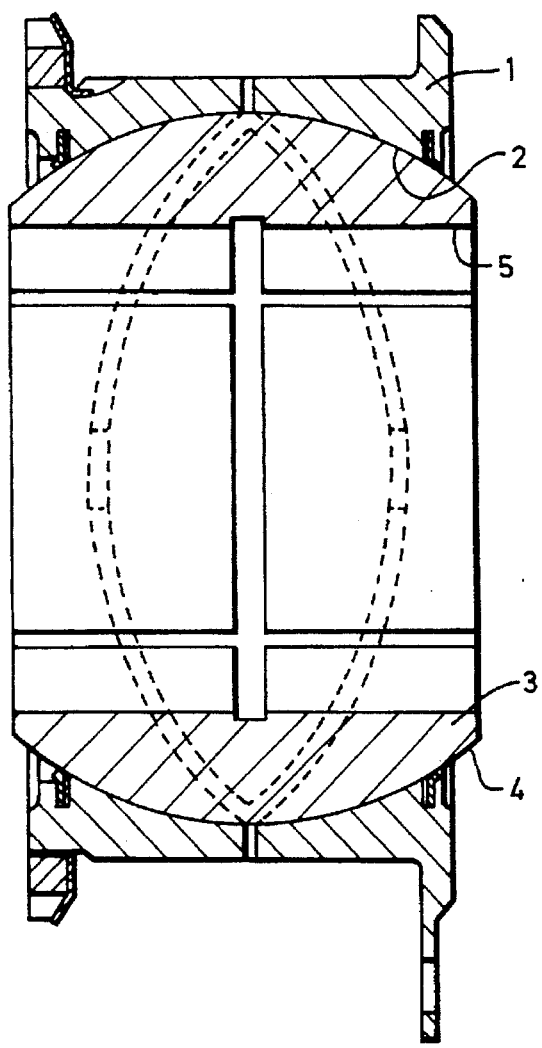
FIG. 1 is a diametral cross-section through an aircraft landing gear trunnion bearing according to the invention.

The aircraft landing gear trunnion bearing of FIG. 1 comprises an outer ring-shaped bearing race 1 with an inner bearing surface 2 formed on a sphere, and an inner ring-shaped bearing member 3 located within the outer bearing race 1 with an outer bearing surface 4 formed on a sphere so as to cooperate with the inner bearing surface 2 of the race 1 and allow relative rotary and sliding contact between the two bearing members 1, 3. The outer bearing race 1 is adapted for connection to one part of aircraft landing gear, and the inner bearing member 3 is formed with a bore 5 to receive the journal of a trunnion on the leg of the landing gear.

The two bearing members 1 and 3 are composed of titanium or titanium alloy, and to avoid galling between the cooperating surfaces of these bearing members, the inner surface 2 of the outer bearing race 1 is chromium plated, and the outer surface 4 of the inner bearing member 3 is coated with nickel and fluorocarbon polisher. The nickel is applied by an electroless plating process and the fluorocarbon polymer is subsequently infused into pores in the plating, and the coating is heat treated to create a smooth surface. This nickel/polymer coating is typically that provided by General Magnaplate Corporation under their trade mark "NEDOX". Typically, the coating is 0.025 to 0.041 mm thick and has a hardness in the range 750–1000 VPN.

Figure 2:
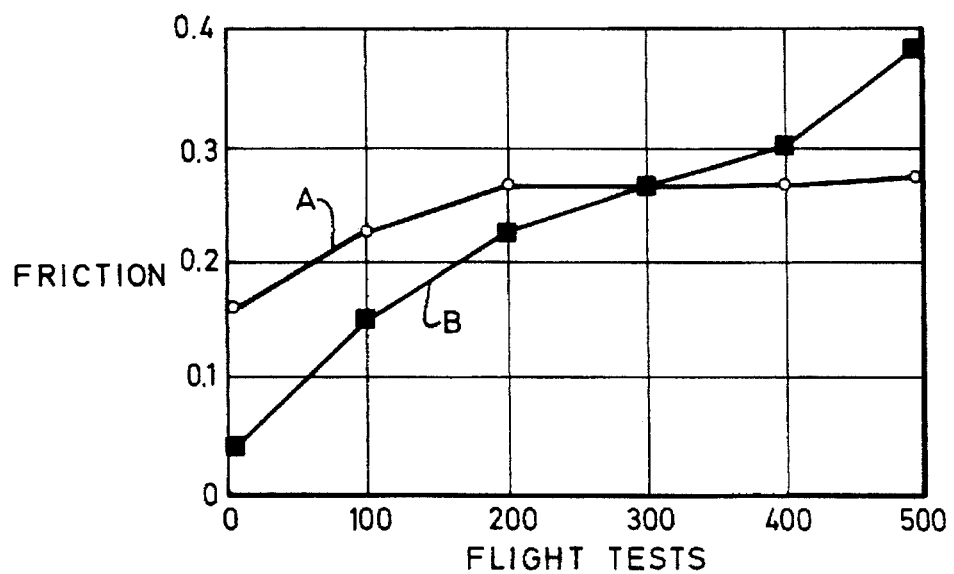
FIG. 2 is a graph of friction against bearing life for a bearing as shown in FIG. 1 compared with a similar bearing in which the outer race is aluminium bronze and the inner spherical member is chromium plated steel.

For comparison purposes, the bearing as described above and a similar "standard" bearing with the outer bearing race 1 composed of chromium plated steel and the inner bearing 3 composed of aluminium bronze, were subjected to successive simulated flight tests with a maximum load of 214 KN. In each case, the cooperating surfaces of the bearing were in good condition after 30,000 flight tests, and were still in good condition after 60,000 flight tests with the bearing according to the invention, but were showing slight wear with the "standard" bearing having aluminium bronze and steel/chromium plated members. Furthermore, the friction between the cooperating surfaces of both bearings were measured at regular intervals and the results shown in FIG. 2 obtained, the friction units shown being dimensionless scaled friction coefficient units used for ease of comparison. This clearly shows that the friction in the bearing according to the invention (curve A) increases to a maximum level after 200 flight tests and remains substantially constant thereafter, whereas the friction in the "standard" bearing (curve B) continues to increase beyond this point and eventually exceeds the maximum level of the bearing according to the invention.

Another series of comparative tests were conducted employing smaller diameter bearings than in the previous tests and in which the outer bearing race 1 was composed of chromium plated titanium and the inner bearing 3 was composed of titaniumwith different surface finishes as indicated below. In each case, a test load of 69 MPa was applied and the inner bearing was made to rotate back and forth through an angle of 50° at a frequency of 0.25 Hz. The relative distance of sliding between the two members 1 and 3 was 25 mm each cycle. The life of the bearings as determined from wear between their cooperating surfaces were assessed as follows:

|  | CYCLES |
| --- | --- |
| Chromium plate | 260 |
| Chromium oxide | 249 |
| Tungsten carbide | 340 |
| Aluminium bronze | 1553 |
| Bronze | 4000 |
| "NEDOX" | 8593 |

These results clearly demonstrate the superior life achieved when using a "NEDOX" surface finish as compared with the other surface finishes.

We claim:

1. A sliding contact bearing comprising two bearing members composed of titanium or a titanium alloy with cooperating sliding surfaces, a first one of which is chromium plated and the second one of which is coated with nickel and fluorocarbon polymer.

2. A bearing as claimed in claim 1 in which the nickel coating is applied by an electroless plating process.

3. A bearing as claimed in claim 1 in which the fluorocarbon is infused into pores in the nickel.

4. A bearing as claimed in claim 1 in which the coating has a hardness 750–1000 VPN.

5. An aircraft landing gear trunnion bearing comprising two bearing members as claimed in claim 1, one bearing member being an outer ring-shaped bearing race, and the other being an inner ring-shaped bearing member located within the outer bearing race with their respective cooperating sliding surfaces formed on a sphere.

6. A bearing as claimed in claim 5 in which the sliding surface of the outer bearing race is chromium plated and the sliding surface oft he inner bearing race is coated with nickel and fluorocarbon polymer.

* * * * *